(12) United States Patent
Fandem et al.

(10) Patent No.: US 11,681,272 B2
(45) Date of Patent: Jun. 20, 2023

(54) AUTOMATED ROTATING EQUIPMENT PRESERVATION

(71) Applicant: Saudi Arabian Oil Company, Dhahran (SA)

(72) Inventors: Qasem A. Fandem, Quatif (SA); Mansour M. Al-Saleh, Al-Ahasa (SA); Abdullah A. Alkhder, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 300 days.

(21) Appl. No.: 17/029,602

(22) Filed: Sep. 23, 2020

(65) Prior Publication Data

US 2022/0091584 A1 Mar. 24, 2022

(51) Int. Cl.
| | | |
|---|---|---|
| *G06K 7/10* | (2006.01) | |
| *G06K 7/14* | (2006.01) | |
| *G05B 19/4155* | (2006.01) | |
| *G06F 16/23* | (2019.01) | |

(52) U.S. Cl.
CPC ..... *G05B 19/4155* (2013.01); *G06F 16/2379* (2019.01); *G06K 7/10366* (2013.01); *G06K 7/1413* (2013.01); *G05B 2219/41329* (2013.01)

(58) Field of Classification Search
CPC ............ G05B 19/4155; G05B 13/0205; G05B 13/021; G05B 13/024; G06F 16/2379; G06K 7/10366; G06K 7/1413
USPC ...................................................... 700/28, 1
See application file for complete search history.

(56) References Cited

U.S. PATENT DOCUMENTS

| | | | |
|---|---|---|---|
| 3,960,028 A | 6/1976 | Martin | |
| 4,903,537 A | 2/1990 | Bahrenburg | |
| 5,201,212 A | 4/1993 | Williams | |
| 5,850,037 A | 12/1998 | Mullins | |
| 7,049,557 B2 | 5/2006 | DeAngelis et al. | |
| 7,066,010 B2 | 6/2006 | Bryant et al. | |
| 7,402,130 B1* | 7/2008 | Sjostedt ................. | B65H 31/20 |
| | | | 270/39.02 |
| 7,475,591 B2 | 1/2009 | Buckley et al. | |
| 8,256,270 B2 | 9/2012 | Fielding et al. | |
| 8,820,046 B2 | 9/2014 | Ross et al. | |

(Continued)

FOREIGN PATENT DOCUMENTS

| | | |
|---|---|---|
| CN | 209503689 | 10/2019 |
| KR | 20170130142 | 11/2017 |

OTHER PUBLICATIONS

Al-Muslim et al., "Develop Acceptance Criteria of Pressure Test of Buried Pipeline Using Uncertainty Analysis" Journal of Pressure Vessel Technology, 2011, 133(1): 011704-1-011704-8, 13 pages.

(Continued)

*Primary Examiner* — Edwyn Labaze
(74) *Attorney, Agent, or Firm* — Fish & Richardson P.C.

(57) ABSTRACT

A gearbox is coupled to a shaft of a motor. The gearbox is configured to be rotated by the motor. An encoder is coupled to the shaft of the motor. The encoder is configured to detect a shaft position. The encoder is configured to produce a position stream indicative of the shaft position. A coupling is configured to receive a separate machine shaft. A controller is coupled to the encoder and the motor. The controller is configured to receive the position stream from the encoder and produce a drive signal to rotate the motor.

20 Claims, 3 Drawing Sheets

(56) References Cited

U.S. PATENT DOCUMENTS

| | | | |
|---|---|---|---|
| 9,164,519 B2 | 10/2015 | Holloway | |
| 2010/0243344 A1* | 9/2010 | Wyrobek | B25J 19/0016 |
| | | | 180/21 |
| 2013/0110417 A1 | 5/2013 | Balogh et al. | |
| 2015/0227127 A1* | 8/2015 | Miller | G16H 20/13 |
| | | | 700/244 |
| 2017/0372196 A1 | 12/2017 | Traidia et al. | |

OTHER PUBLICATIONS

American Petroleum Institute, "Recommended Practice for the Pressure Testing of Steel Pipelines for the Transportation of Gas, Petroleum Gas, Hazardous Liquids, Highly Volatile Liquids, or Carbon Dioxide," API RP 1110, 6th edition, Feb. 2013, re-affirmed Aug. 2018, 3 pages.

Australian Standard, Pipelines—Gas and liquid petroleum, Part 5: Field Pressure Testing, "Appendix C: Pressure-Volume-Temperature Relationships in Pipeline Test Sections (Normative)," AS 2885.5:2012, 2012, 62-67, 6 pages.

Bahadori et al., "Prediction of bulk modulus and volumetric expansion coefficient of water for leak tightness test of pipelines," International Journal of Pressure Vessels and Piping, 2009, 86: 550-554.

Moffat, "Contribution to the Theory of Single-Sample Uncertainty Analysis" Journal of Fluids Engineering, 104, 1982, 250-260, 9 pages.

PCT International Search Report and Written Opinion in International Appln. No. PCT/US2021/051529, dated Jan. 4, 2022, 15 pages.

Finley et al., "Storage of Electric Motors," Pulp and Paper Industry Technical Conference, Jun. 12-16, 1995, 8 pages.

Scales, "Pumps: How to avoid damage when a pump is stored—Canadian Mining Journal," Aug. 2019, 3 pages.

Spence, "Preventative Maintenance for Long Term Pump Storage," Crane Engineering, Jan. 2017, 4 pages.

\* cited by examiner

AUTOMATED ROTATING EQUIPMENT PRESERVATION

TECHNICAL FIELD

This disclosure relates to rotating machine shafts for preservation, for example, during long periods where the machine is shut-down or under construction.

BACKGROUND

During extended periods of disuse, rotating equipment must be preserved in a variety of ways, including rotor, or shaft, turning. Shaft turning involves rotating the shaft of the rotating equipment periodically to prevent rotor sag and move lubricant through the bearings. Such extended periods of disuse can include plant turn-arounds, spare pieces of equipment in storage, or equipment still under construction. The amount of shaft rotation and frequency of shaft rotation is dictated by equipment manufactures or regulatory bodies, such as the American Petroleum Institute (API).

SUMMARY

This disclosure describes technologies relating to automated rotating equipment preservation.

An example of the subject matter described within this disclosure is an equipment preservation cart with the following features. A gearbox is coupled to a shaft of a motor. The gearbox is configured to be rotated by the motor. An encoder is coupled to the shaft of the motor. The encoder is configured to detect a shaft position. The encoder is configured to produce a position stream indicative of the shaft position. A coupling is configured to receive a separate machine shaft. A controller is coupled to the encoder and the motor. The controller is configured to receive the position stream from the encoder and produce a drive signal to rotate the motor.

Aspects of the example equipment preservation cart, that can be included with the example equipment preservation cart alone or with other aspects, include the following. The coupling includes a flexible coupling.

Aspects of the example equipment preservation cart, that can be included with the example equipment preservation cart alone or with other aspects, include the following. The cart further include height adjustable legs.

Aspects of the example equipment preservation cart, that can be included with the example equipment preservation cart alone or with other aspects, include the following. The height adjustable legs include hydraulic adjusters.

Aspects of the example equipment preservation cart, that can be included with the example equipment preservation cart alone or with other aspects, include the following. The controller is further configured to send a signal to the hydraulic adjusters to adjust a height of the cart.

Aspects of the example equipment preservation cart, that can be included with the example equipment preservation cart alone or with other aspects, include the following. A variable speed drive is coupled to the motor. The variable speed drive is configured to control a rotational speed of the motor.

Aspects of the example equipment preservation cart, that can be included with the example equipment preservation cart alone or with other aspects, include the following. The controller is configured to receive a route that includes a list of separate machine shafts to be rotated and a designated amount of rotation needed for each of the separate machine shafts. The controller is also configured to send a drive signal to a motor to rotate a shaft of one of the list of separate machines by the designated amount for each of the separate machine shafts. The controller is also configured to update a database with data including that the shaft of the separate machine was rotated and the designated amount that the shaft was rotated.

Aspects of the example equipment preservation cart, that can be included with the example equipment preservation cart alone or with other aspects, include the following. An RFID scanner or barcode scanner is configured to scan a machine tag, the machine tag comprising information about the separate machine, the RFID scanner or barcode scanner configured to produce a device stream comprising the information from the machine tag.

Aspects of the example equipment preservation cart, that can be included with the example equipment preservation cart alone or with other aspects, include the following. The controller is configured to receive the device stream from either the RFID scanner or the barcode scanner.

An example of the subject matter described within this disclosure is a method with the following features. A route is received by a controller. The route includes a designated amount of rotation needed for each of a multiple separate machine shafts. one of the separate machine shafts is received by a coupling. The shaft is rotated by a motor coupled to the coupling by the designated amount of rotation. A completion of the rotation is recorded by a controller.

Aspects of the example method, that can be included with the example method alone or with other aspects, include the following. The route further includes a list of separate machine shafts to be rotated.

Aspects of the example method, that can be included with the example method alone or with other aspects, include the following. The designated amount is two and one quarter rotations.

Aspects of the example method, that can be included with the example method alone or with other aspects, include the following. After recording the completion of the rotations, information in a database is updated by the controller.

Aspects of the example method, that can be included with the example method alone or with other aspects, include the following. The information updated in the database includes which machines along the route that have had their shaft rotated. The information updated in the database includes the amount of rotation each of the shafts was rotated. The information updated in the database includes a date of the shaft rotation.

Aspects of the example method, that can be included with the example method alone or with other aspects, include the following. Updating the information in the database by the controller includes updating the database by a wireless network.

Aspects of the example method, that can be included with the example method alone or with other aspects, include the following. Updating the information in the database by the controller includes updating the database by a wired connection.

An example of the subject matter described within this disclosure is a system with the following features. A system database includes data about multiple rotating machines. The data includes an amount of shaft rotation for each rotating machine and a frequency of shaft rotation for each rotating machine. A wireless network couples a controller and the database. The wireless network provides communication between the controller and the database. An equipment preservation cart includes a motor. A gearbox is coupled to a shaft of the motor. The gearbox is configured to be rotated by the motor. An encoder is coupled to the shaft of the motor. The encoder is configured to detect a shaft position. The encoder is configured to produce a position stream indicative of the shaft position. A coupling is configured to receive a separate machine shaft. The controller is coupled to the encoder and the motor. The controller is configured to receive the position stream from the encoder. The controller is configured to produce a drive signal to rotate the motor. The controller is configured to receive a route from the database, by the wireless network. The route includes a list of a plurality of separate machine shafts to be rotated and a designated amount of rotation needed for each of the plurality of separate machine shafts.

Aspects of the example system, that can be included with the example system alone or with other aspects, include the following. The equipment preservation cart further includes height adjustable legs.

Aspects of the example system, that can be included with the example system alone or with other aspects, include the following. The height adjustable legs include pneumatic adjusters.

Aspects of the example system, that can be included with the example system alone or with other aspects, include the following. The equipment preservation cart is a self-propelled cart.

Aspects of the example system, that can be included with the example system alone or with other aspects, include the following. The controller is further configured to send a drive signal to the motor to rotate a shaft of one of the separate machines shafts by the designated amount for each of the separate machine shafts. The controller is further configured to update a database with data including that the shaft of the one of the separate machine was rotated and the designated amount that the machine shaft was rotated.

Particular implementations of the subject matter described in this disclosure can be implemented so as to realize one or more of the following advantages. The subject matter described herein can ensure rotary equipment is preserved properly per manufacturer specifications or industry specification. The subject matter described herein can provide permanent record for equipment's shaft rotation, reduce the errors within rotating equipment preservation records, and reduce the frequency of equipment failure during project start-up due to shaft sagging. In some implementations, the subject matter described herein automatically performs shaft rotation for equipment preservation. The subject matter described herein includes a portable controller for preservation of rotation equipment. The controller is capable of sending alerts for due/overdue equipment to a central inspection database for immediate update.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In facilities that have several pieces of dormant rotating equipment in disuse, preservation procedures can be difficult to perform, track, or both. For example, API-686 requires certain equipment to have their shaft rotated 2¼ turns) (810°) every so often. For large pieces of equipment, manually rotating shafts and rotors can be difficult and dangerous due to potential muscle strain of the operator. In addition, different pieces of equipment can require different shaft rotation frequencies and shaft rotation amounts. Keeping track of such rotation schedules and routes can be difficult for large facilities, or with facilities with rotating shifts.

This disclosure relates to a portable equipment preservation cart that includes a motor and an automatic digital preservation controller. The cart is used to rotate multiple, different dormant pieces of rotating equipment. The controller is smart, that is, the controller is able to track and alert the operator or inspector which equipment needs to be preserved (shaft turned or rotated), and records when turning is complete on each piece of equipment. The rotor of each piece of equipment can be rotated an amount (frequency and number of rotations) that matches guidelines set by a regulatory body, such as the American Petroleum Institute (API), or set by the equipment manufacturer. Such guidelines can be pre-set in the controller for a planned preservation route.

Figure 1:
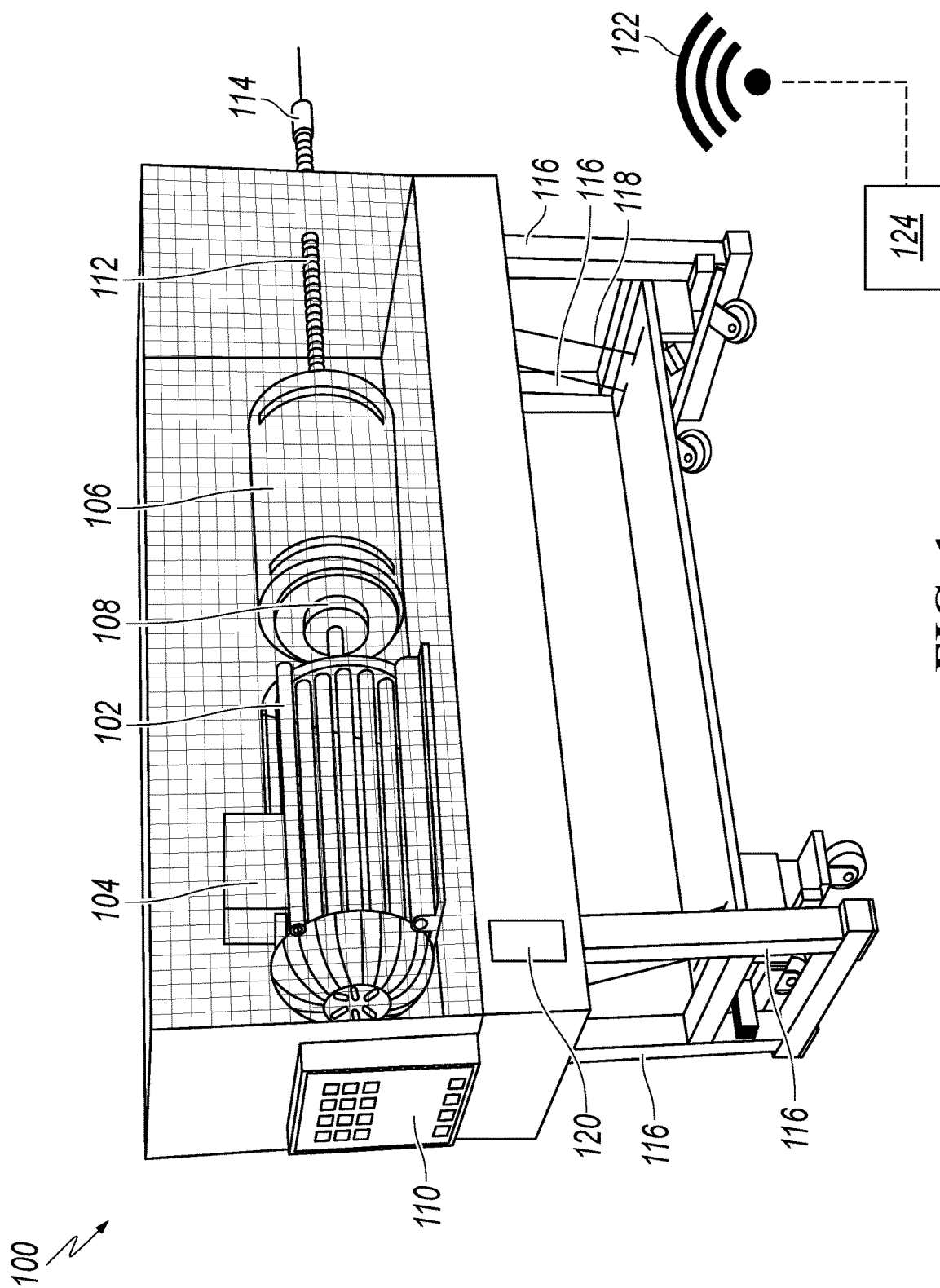
FIG. 1 is a cutaway view of an example equipment preservation cart.

FIG. 1 is a cutaway view of an example equipment preservation equipment preservation cart 100. The equipment preservation equipment preservation cart 100 includes a motor 102. The motor 102 can include an electric motor, a pneumatic motor, a hydraulic motor, or any other motor with suitable torque and speed control. In instances where an electric motor is used, the electric motor can be an inductive motor, a permanent magnet motor, or any electric motor with suitable torque and speed control. Regardless of the type of motor used, in some implementations, a variable speed drive 104 (VSD) is included with the equipment preservation cart 100. The VSD 104 is configured to regulate a rotational speed of the motor 102. While shown as being physically attached to the motor, in some implementations, the VSD 104 can be external to the equipment preservation cart 100. In such an implementation, the motor 102 can be "plugged in" to a power supply, for example, a pneumatic, hydraulic, or electric power supply, and the external power supply can be regulated by such an external VSD 104. In implementations where the equipment preservation cart 100 operates under its own power, the equipment preservation cart 100 includes its own power supply, such as batteries, super capacitors, or pneumatic tanks. In some implementations, the equipment preservation cart 100 can include solar panels to recharge onboard batteries. Such implementations can be particularly useful at remote sites with limited or unreliable power.

Coupled to the shaft of the motor 102 is a gearbox 106. The gearbox 106 is configured to be rotated by the motor 102. The gearbox 106 provides a drive ratio to change a rotational speed and torque of the motor 102. That is, an input shaft of the gearbox 106 rotates in unison with the motor 102, then the gearbox 106 provides a rotational speed and torque from an output shaft of the gearbox 106. The output speed and torque can be different from the input speed and torque. For example, the gearbox 106 may reduce a rotational speed and increase the torque. Such an arrangement can reduce the size of the motor needed for machine shaft rotations. The gearbox 106 itself can include gear sets, belts and pulleys, fluid couplings, or any other torque transfer systems. While primarily illustrated and described as having a gearbox 106, in some implementations, the gearbox 106 can be omitted from the equipment preservation cart 100 without departing from this disclosure.

An encoder 108 is coupled to the shaft of the motor 102 or the gearbox 106. The encoder 108 is configured to detect a shaft position of either the shaft of the motor 102 or the shaft of the gearbox 106. The encoder 108 is also configured to produce a position stream indicative of the shaft position. The encoder stream can include a digital or analog signal stream that can be received and interpreted by a controller, such as controller 110. The encoder 108 itself can include any encoder suitable for the application, such as a brushed or optical encoder. In some implementations, the encoder 108 is integrated into the motor 102 or gearbox 106. In some implementations, the encoder 108 is a separate, discrete unit.

At the end of the output shaft 112 of the gearbox 106 is a coupling 114 configured to receive a separate machine shaft. This coupling 114 can include any coupling of sufficient flexibility and strength to connect to shafts of separate machines. For example, the coupling 114 can include a flexible coupling. In some implementations, the coupling 114 can be swapped out for individual machines. In such implementations, the equipment preservation cart 100 can include storage for such coupling components.

In some implementations, the equipment preservation cart 100 also includes height adjustable legs 116. The height adjustable legs 116 can be used to better alight the coupling 114 with the machine shaft to be rotated. The height adjustable legs 116 can include hydraulic, pneumatic, or electric actuators 118 to adjust the height of the equipment preservation cart 100.

While illustrated as being on simple castors, in some implementations, the equipment preservation cart 100 can be self-propelled. That is the equipment preservation cart 100 can move under its own power. In such implementations, the equipment preservation cart 100 includes one or more drive motors coupled to wheels of the cart to provide motive force. In such instances the equipment preservation cart 100 can be controlled by an operator with a wired or wireless controller.

In some implementations, the equipment preservation cart 100 can include a radio frequency identification (RFID) scanner or barcode scanner 120 configured to scan a machine tag. Such a tag would be located on a machine that could need its shaft turned. The machine tag itself includes information about the machine on which the tag is located. For example, an identification number. The RFID scanner or barcode scanner 120 is configured to produce a device stream that includes the information from the machine tag. The device stream can include an analog or digital signal that can be interpreted by the controller 110.

The equipment preservation cart 100 also includes a controller 110 coupled to the encoder 108, the motor 102, and the RFID scanner or barcode scanner 120 (if included). As such, the controller 110 is configured to receive the device stream from either the RFID scanner or the barcode scanner 120, receive the position stream from the encoder 108 or both. In some implementations, the controller 110 is configured for network connectivity through either a wireless network 122 or a wired network. Such connectivity allows the controller 110 to communicate with a system database 124. The system database 124 can include information, or data, about a plurality rotating machines. For example, the system database 124 can include information about an amount of shaft rotation for each rotating machine, and a frequency of shaft rotation for each rotating machine. With a connection to this system database 124, the controller 110 receives a route for the equipment preservation cart 100. The route includes a list of separate machine shafts to be rotated. The route also includes a designated amount of rotation needed for each of the separate machine shafts. Once the equipment preservation cart 100 is moved in position at a designated rotating machine, either by an operator or under its own power, the controller 110 sends a signal to the height adjustable legs 116 to adjust the height of the equipment preservation cart 100 so that the coupling 114 can receive the shaft from the machine. Once the machine shaft has been received by the coupling 114, and the machine shaft is secured to the coupling 114 to rotate in unison with the coupling 114, the controller 110 then produces a drive signal to rotate the motor 102 such that it rotates the machine shaft by the designated amount. After the machine shaft has been rotated the designated amount, in some implementations, the controller 110 updates the system database 124 with information, including that the shaft of the separate machine was rotated and the designated amount that the shaft was rotated.

Figure 2:
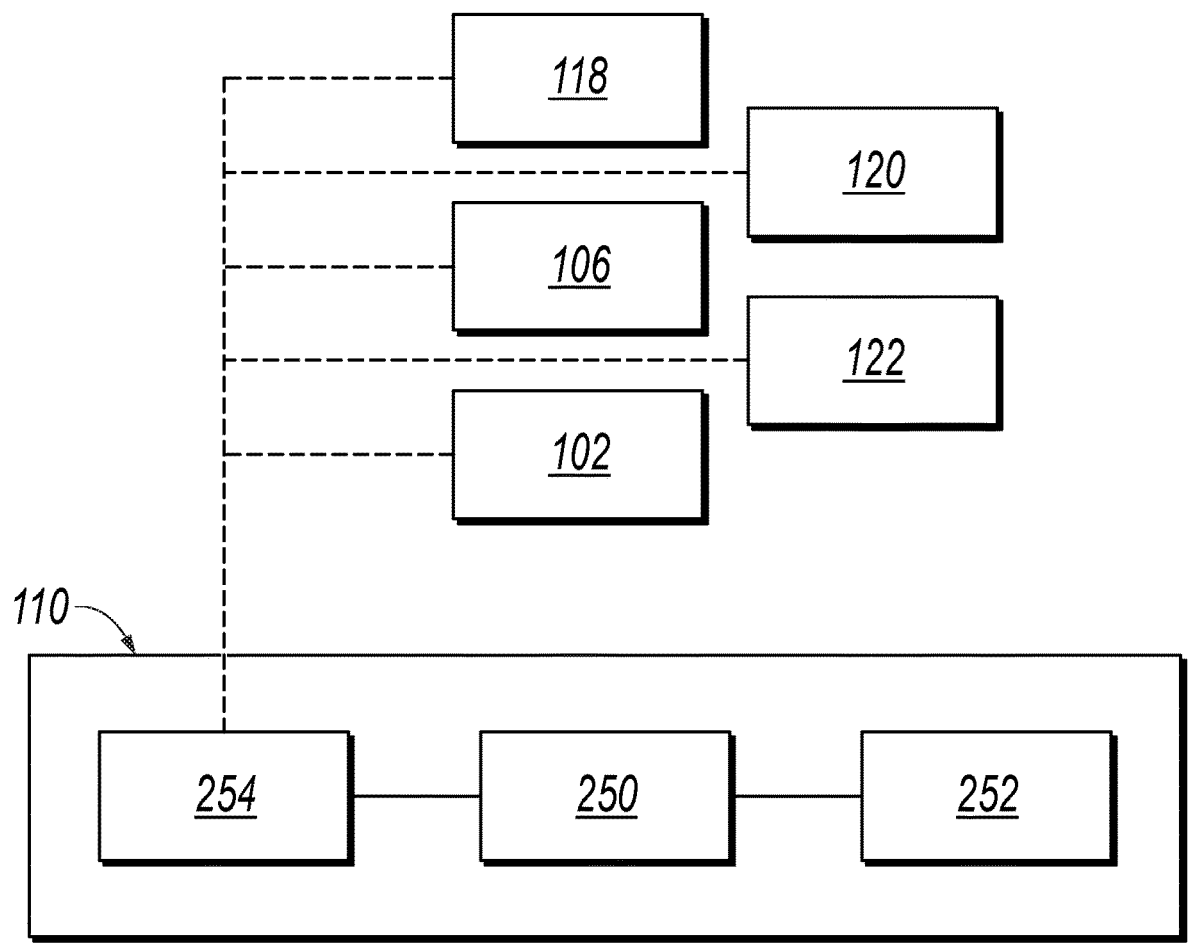
FIG. 2 is a block diagram of an example controller that can be used with aspects of this disclosure.

FIG. 2 is a block diagram of an example controller 110 that can be used with aspects of this disclosure. The controller 110 can, among other things, monitor parameters of the equipment preservation cart 100 and send signals to actuate and/or adjust various operating parameters of the equipment preservation cart 100. As shown in FIG. 2, the controller 110, in certain instances, includes a processor 250 (e.g., implemented as one processor or multiple processors) and a memory 252 (e.g., implemented as one memory or multiple memories) containing instructions that cause the processors 250 to perform operations described herein. The processors 250 are coupled to an input/output (I/O) interface 254 for sending and receiving communications with components in the system, including, for example, the encoder 108. In certain instances, the controller 110 can additionally communicate status with and send actuation and/or control signals to one or more of the various system components (including an actuator system, such as the height adjustable legs 116) of the equipment preservation cart 100, as well as other sensors (e.g., current sensor, accelerometers for leveling, and other types of sensors) provided in the equipment preservation cart 100. In certain instances, the controller 110 can communicate status and send actuation and control signals to one or more of the components within the equipment preservation cart 100, such as the motor 102. The communications can be hard-wired, wireless, or a combination of wired and wireless. In some implementations, controllers similar to the controller 110 can be located elsewhere, such as in a control room, elsewhere on a site or even remote from the site. In some implementations, the controller 110 can be a distributed controller with different portions located on the equipment preservation cart 100, about a site, or off site. Additional controllers can be used throughout the site as stand-alone controllers or networked controllers without departing from this disclosure.

The controller 110 can have varying levels of autonomy for controlling the equipment preservation cart 100. For example, the controller 110 can receive the route from the system database 124 and a device stream from the RFID scanner or barcode scanner 120, and an operator manually controls an amount of shaft rotation based on the information displayed by the controller 110. Alternatively, the controller 110 can receive the route from the system database 124 and a device stream from the RFID scanner or barcode scanner 120, receive an additional input from an operator, and begin rotating a machine shaft the designated amount with no other input from an operator.

Figure 3:
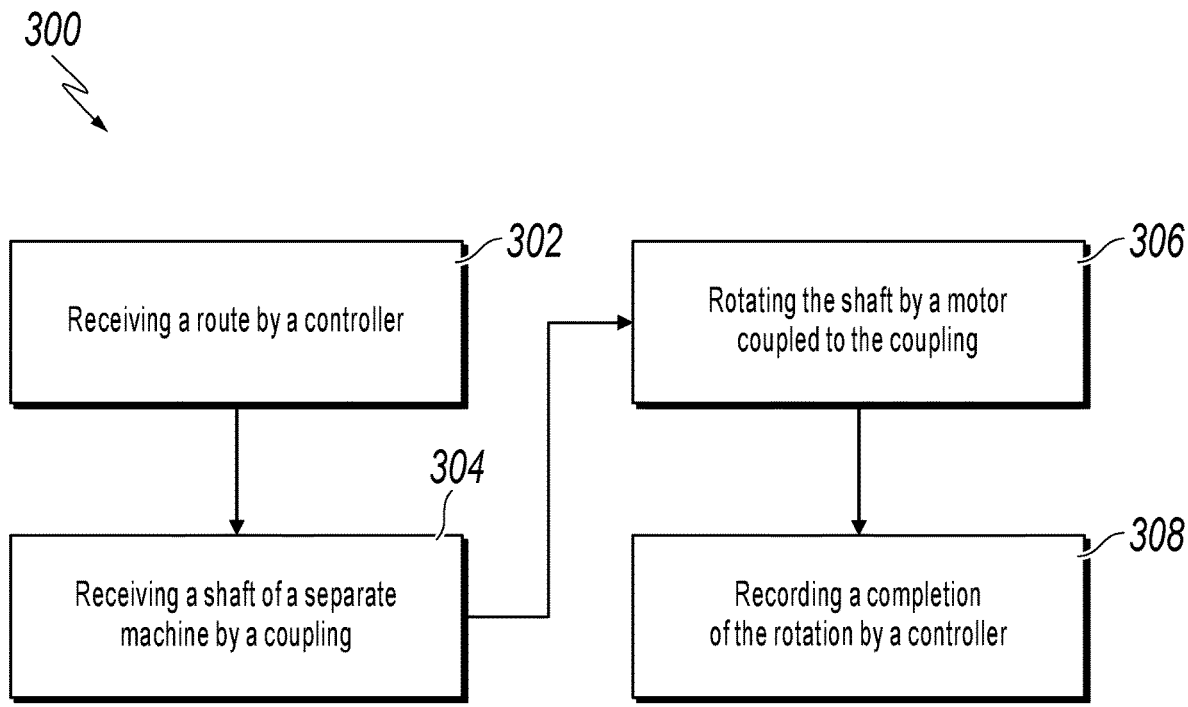
FIG. 3 is a flowchart of an example method that can be used with aspects of this disclosure.

FIG. 3 is a flowchart of an example method 300 that can be used with aspects of this disclosure. At 302, a route is received by the controller 110. In some implementations, the route includes a designated amount of rotation needed for each of a plurality of separate machine shafts. At 304, one of the plurality of separate machine shafts is received by the coupling 114. At 306, the one of the plurality of separate machine shafts is rotated by the motor 102 coupled to the coupling 114 by the designated amount of rotation. For example, the designated amount of turn can be 2¼ rotations (810°). At 308, a completion of the rotation is recorded by a controller 110.

After recording the completion of the rotations, the controller 110 updates information in the system database 124. The controller 110 can update the information in the system database 124 through a wireless or wired connection. In some implementations, the updated information is taken from the controller 110, for example, by a flash drive or other storage medium, and is uploaded to a separate computer or server by the flash drive. The information updated in the system database 124 can include which machines along the route that have had their shaft rotated, the amount of rotation each of the shafts was rotated, and a date of the shaft rotation. In some implementations, the information can include the name of the operator that rotated the shafts.

Implementations of the subject matter and the operations described in this disclosure can be implemented in digital electronic circuitry, or in computer software, firmware, or hardware, including the structures disclosed in this disclosure and their structural equivalents, or in combinations of one or more of them. Implementations of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this disclosure can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this disclosure can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this disclosure, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described program components and systems can generally be integrated together in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An equipment preservation cart comprising:
a motor;
a gearbox coupled to a shaft of the motor, the gearbox configured to be rotated by the motor;
an encoder coupled to the shaft of the motor, the encoder configured to detect a shaft position, the encoder configured to produce a position stream indicative of the shaft position;
a coupling configured to receive a separate machine shaft; and
a controller coupled to the encoder and the motor, the controller configured to:
receive the position stream from the encoder; and
produce a drive signal to rotate the motor,
wherein the controller is configured to:
receive a route comprising:
a list of separate machine shafts to be rotated; and
a designated amount of rotation needed for each of the separate machine shafts,
send a drive signal to a motor to rotate a shaft of one of the list of separate machines by the designated amount for each of the separate machine shafts, and
update a database with data including that the shaft of the separate machine was rotated and the designated amount that the shaft was rotated.

2. The equipment preservation cart of claim 1, wherein the coupling comprises a flexible coupling.

3. The equipment preservation cart of claim 1, wherein the cart further comprises height adjustable legs.

4. The equipment preservation cart of claim 3, wherein the height adjustable legs comprise hydraulic adjusters.

5. The equipment preservation cart of claim 4, wherein the controller is further configured to:
send a signal to the hydraulic adjusters to adjust a height of the cart.

6. The equipment preservation cart of claim 1, further comprising a variable speed drive coupled to the motor, the variable speed drive configured to control a rotational speed of the motor.

7. The equipment preservation cart of claim 1, further comprising an RFID scanner or barcode scanner configured to scan a machine tag, the machine tag comprising information about the separate machine, the RFID scanner or barcode scanner configured to produce a device stream comprising the information from the machine tag.

8. The equipment preservation cart of claim 7, wherein the controller is configured to receive the device stream from either the RFID scanner or the barcode scanner.

9. A method comprising:
receiving a route by a controller, the route comprising a designated amount of rotation needed for each of a plurality of separate machine shafts;
receiving one of the plurality of separate machine shafts by a coupling;
rotating the shaft by a motor coupled to the coupling by the designated amount of rotation; and
recording a completion of the rotation by a controller.

10. The method of claim 9, wherein the route further comprises a list of separate machine shafts to be rotated.

11. The method of claim 9, wherein the designated amount is two and one quarter rotations.

12. The method of claim 9, further comprising, after recording the completion of the rotations, updating information in a database, by the controller.

13. The method of claim 12, wherein the information updated in the database comprises:
   machines along the route that have had their shaft rotated;
   the amount of rotation each of the shafts was rotated; and
   a date of the shaft rotation.

14. The method of claim 12, wherein updating the information in the database by the controller comprises updating the database by a wireless network.

15. The method of claim 12, wherein updating the information in the database by the controller comprises updating the database by a wired connection.

16. A system comprising:
   system database comprising data about a plurality of rotating machines, the data including:
      an amount of shaft rotation for each rotating machine; and
      a frequency of shaft rotation for each rotating machine; and
   a wireless network coupling a controller and the database, the wireless network providing communication between the controller and the database;
   a equipment preservation cart comprising:
      a motor;
      a gearbox coupled to a shaft of the motor, the gearbox configured to be rotated by the motor;
      an encoder coupled to the shaft of the motor, the encoder configured to detect a shaft position, the encoder configured to produce a position stream indicative of the shaft position;
      a coupling configured to receive a separate machine shaft;
      the controller coupled to the encoder and the motor, the controller configured to:
         receive the position stream from the encoder;
         produce a drive signal to rotate the motor;
         receive a route from the database, by the wireless network, the route comprising:
            a list of a plurality of separate machine shafts to be rotated; and
            a designated amount of rotation needed for each of the plurality of separate machine shafts.

17. The system of claim 16, wherein the equipment preservation cart further comprises height adjustable legs.

18. The system of claim 17, wherein the height adjustable legs comprise pneumatic adjusters.

19. The system of claim 16, wherein the equipment preservation cart is a self-propelled cart.

20. The system of claim 16, wherein the controller is further configured to:
   send a drive signal to the motor to rotate a shaft of one of plurality of separate machines shafts by the designated amount for each of the plurality of separate machine shafts, and
   update a database with data including that the shaft of the one of the plurality of separate machine was rotated and the designated amount that the machine shaft was rotated.

* * * * *